UNITED STATES PATENT OFFICE.

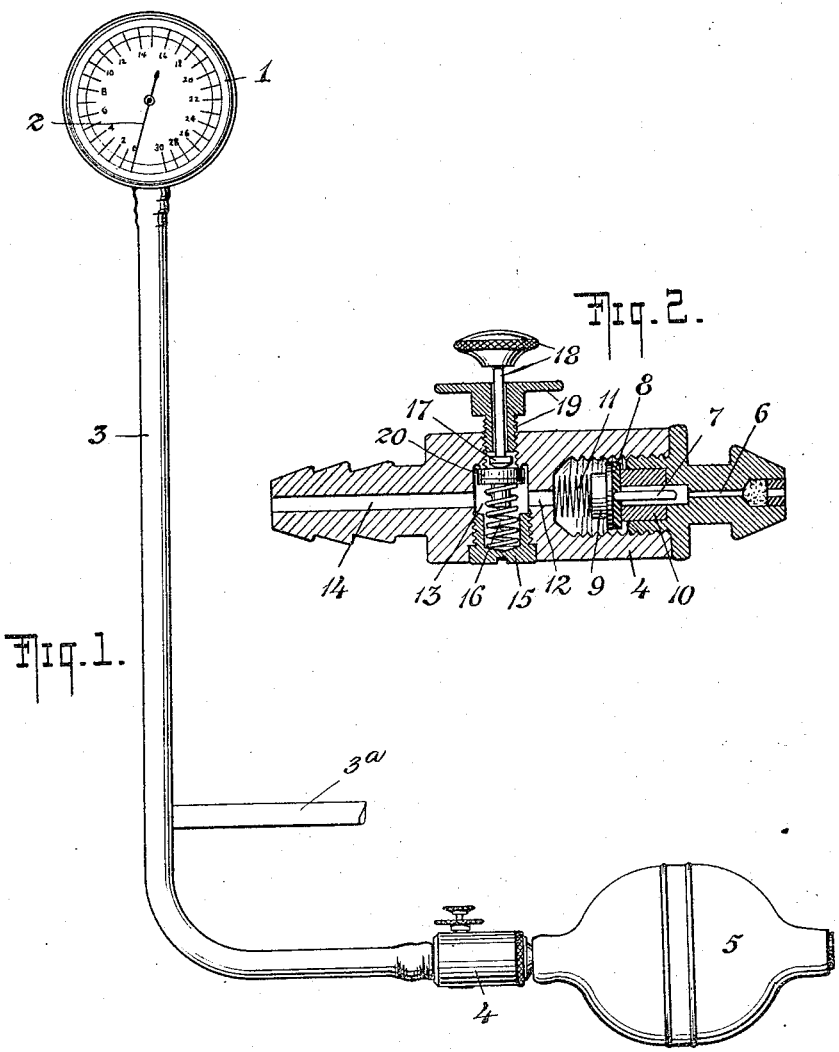

RALPH F. SCHNEIDER, OF NEW YORK, N. Y., ASSIGNOR TO CHARLES J. TAGLIABUE, OF BROOKLYN, NEW YORK.

SPHYGMOMANOMETER.

1,209,213.

Specification of Letters Patent.

Patented Dec. 19, 1916.

Application filed December 2, 1913. Serial No. 804,189.

*To all whom it may concern:*

Be it known that I, RALPH F. SCHNEIDER, a citizen of the United States, and a resident of the borough of the Bronx, county of Bronx, city and State of New York, have invented certain new and useful Improvements in Sphygmomanometers, of which the following is a specification.

My invention relates to means for so controlling the gage of a sphygmomanometer that any desired actuation of the pointer on the dial may be brought about while the said pointer may also be arrested at any desired figure or be instantaneously returned to the starting point.

Heretofore in most instances sphygmomanometers and especially those of the mercurial type have been incapable of any accurate control whatsoever.

It is the object of this invention to bring about accurate and substantially perfect control. Means by which this is accomplished is shown in the drawings in which—

Figure 1 illustrates the device as a whole and Fig. 2 an enlarged section through the valve mechanism.

In the example illustrated 1 is the usual gage constructed in any suitable manner provided with a dial and a pointer 2. The tube 3 communicates at one end with the gage 1 and at its other end connects with the valve casing 4 on one end; the bulb 5 being attached on the other end of the valve casing 4. The said tube 3 further, may be connected by means of a branch tube 3ª with the customary pneumatic device adapted for attachment to the arm or other part of the body of the person under observation in the usual manner.

In using the device illustrated the air passes from the bulb through the passage 6 around the pin 7 against the washer 8 on the pin seat 9. The washer 8 rests against an apertured hard rubber plug 10 and is normally held against the seat thereof by the spring 11. As the air from the bulb unseats the valve 8, 9, it passes through the passage 12 into the chamber 13 and out of said chamber into the passage 14 and then on to the gage and through the branch tube 3ª to the pneumatic device in the usual manner. The bottom part of the chamber 13 is formed of the socket screw 15. The spring 16 plays against the valve 20 below the enlarged inner head 17 of the plunger 18. The plunger 18 is loosely journaled in the micrometer screw 19, the lower face of which is adapted to abut loosely against the head 17 of the plunger. After the gage has been inflated a turn on the screw 19 in the proper direction presses the head 17 of the plunger 18 against the valve 20 and opens the valve to permit the escape of a volume of air corresponding to the amount of rotation given to the micrometer screw. In escaping as described the air passes from the chamber 13 around the open valve 20 and leaks between the inner end of the screw 19 and the loosely fitting head 17 out through the aperture of said screw 19 in which the stem of the plunger 18 loosely fits. This screw 19 can be accurately regulated by hand so as to bring about the exact degree of deflation and consequent actuation of the gage that is desired for the purpose of making precise and correct observations. Complete deflation of the gage can be brought about at any instant by pressing the plunger 18. If observations should be taken on the gage at some specific point of the dial, it is only necessary to turn the micrometer screw in the opposite direction to again reseat the valve 20 as shown in Fig. 2 after which the pointer on the dial will be checked at the desired point so that observations can be taken there.

It is manifest that numerous variations and modifications of the structure may be made without departing from the spirit of my invention.

I claim:

1. A valve of the kind described comprising a casing having an inlet adapted for connection with an inflating means, and an outlet adapted for connection with the element to be inflated, said casing being further provided with an escape aperture, means for closing said aperture, means for actuating said closing means whereby the escape of air from said casing is accurately controlled in a predetermined manner and means for permitting the instantaneous escape of air through said aperture.

2. A valve of the kind described comprising a casing having an inlet adapted for connection with an inflating means, and an outlet adapted for connection with the element to be inflated, a rotatable screw-threaded member having an axial escape aperture, a valve controlling the communication between said casing and said axial aperture, and adapted to be actuated by said rotatable member whereby the escape of air from said casing is accurately controlled in a predetermined manner and a plunger extending through said axial aperture and adapted to actuate said valve for permitting the instantaneous escape of air through said aperture.

3. A valve of the kind described comprising a casing having an inlet adapted for connection with an inflating means, and an outlet adapted for connection with the element to be inflated, said casing being further provided with an escape aperture, a valve controlling the inlet and preventing back passage of the air therethrough, a screw threaded member rotatable in said escape aperture and having an axial aperture communicating therewith and with the atmosphere, a plunger extending through said axial aperture and having an enlarged inner end, an operating head on the outer end of said plunger and a valve arranged to normally close said escape aperture, said screw thread member being adapted to bear upon the enlarged inner end of said plunger to cause the same to actuate said last named valve whereby the escape of air from the casing is accurately controlled in a predetermined manner and said plunger being arranged to independently actuate said last named valve for permitting the instantaneous escape of air from said casing.

In testimony whereof I have hereunto set my hand in the presence of two subscribing witnesses.

RALPH F. SCHNEIDER.

Witnesses:
  FRITZ ZIEGLER, Jr.,
  LOUIS ALEXANDER.

Copies of this patent may be obtained for five cents each, by addressing the "Commissioner of Patents, Washington, D. C."